US008504854B2

(12) United States Patent
Naffziger et al.

(10) Patent No.: US 8,504,854 B2
(45) Date of Patent: Aug. 6, 2013

(54) MANAGING MULTIPLE OPERATING POINTS FOR STABLE VIRTUAL FREQUENCIES

(75) Inventors: Samuel D. Naffziger, Fort Collins, CO (US); John P. Petry, San Diego, CA (US); William A. Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 463 days.

(21) Appl. No.: 12/819,777

(22) Filed: Jun. 21, 2010

(65) Prior Publication Data

US 2011/0314312 A1 Dec. 22, 2011

(51) Int. Cl.
*G06F 1/26* (2006.01)

(52) U.S. Cl.
USPC .......................................... 713/323

(58) Field of Classification Search
USPC .......................................... 713/323
See application file for complete search history.

(56) References Cited

U.S. PATENT DOCUMENTS

| | | |
|---|---|---|
| 3,382,460 A | 5/1968 | Blitz et al. |
| 3,997,800 A | 12/1976 | Bain |
| 4,105,979 A | 8/1978 | Kage |
| 4,186,637 A | 2/1980 | Swain et al. |
| 4,191,942 A | 3/1980 | Long |
| 4,284,906 A | 8/1981 | Manfredi |
| 4,315,166 A | 2/1982 | Hughes |
| 4,471,310 A | 9/1984 | Yenisey |
| 4,573,017 A | 2/1986 | Levine |
| 4,855,622 A | 8/1989 | Johnson |
| 5,485,129 A | 1/1996 | Franson et al. |
| 5,517,521 A | 5/1996 | Strawn |
| 5,600,347 A | 2/1997 | Thompson et al. |
| 5,712,826 A | 1/1998 | Wong et al. |
| 5,740,417 A | 4/1998 | Kennedy et al. |
| 5,764,089 A | 6/1998 | Partovi et al. |

(Continued)

FOREIGN PATENT DOCUMENTS

| | | |
|---|---|---|
| EP | 1241788 | 9/2002 |
| WO | WO 2007/024396 | 3/2007 |

OTHER PUBLICATIONS

Charles Lefurgy, et al.; "Server-Level Power Control"; Autonomic Computing, 2007. ICAC '07. Fourth International Conference O N, IEEE, PI, Jun. 1, 2007, pp. 1-10.

(Continued)

*Primary Examiner* — Kim Huynh
*Assistant Examiner* — Eric Chang
(74) *Attorney, Agent, or Firm* — Rory D. Rankin; Meyertons, Hood, Kivlin, Kowert & Goetzel, P.C.

(57) ABSTRACT

A system and method for managing multiple discrete operating points to create a stable virtual operating point. One or more functional blocks within a processor produces data corresponding to an activity level associated with the respective functional block. A power manager determines a power consumption value based on the data once every given sample interval. In addition, the power manager determines a signed accumulated difference over time between a thermal design power (TDP) and the power consumption value. The power manager selects a next power-performance state (P-state) based on comparisons of the signed accumulated difference and given thresholds. Transitioning between P-states in this manner while the workload does not significantly change causes the processor to operate at a virtual operating point between supported discrete operating points.

20 Claims, 5 Drawing Sheets

U.S. PATENT DOCUMENTS

| | | | |
|---|---|---|---|
| 5,825,218 | A | 10/1998 | Colli et al. |
| 5,889,436 | A | 3/1999 | Yeung et al. |
| 5,917,355 | A | 6/1999 | Klass |
| 5,964,881 | A | 10/1999 | Thor |
| 6,043,692 | A | 3/2000 | Linoff |
| 6,278,308 | B1 | 8/2001 | Partovi et al. |
| 6,289,067 | B1 | 9/2001 | Nguyen et al. |
| 6,292,062 | B1 | 9/2001 | Bourk et al. |
| 6,329,861 | B1 | 12/2001 | Francis |
| 6,473,732 | B1 | 10/2002 | Chen |
| 6,510,525 | B1 | 1/2003 | Nookala et al. |
| 6,518,845 | B2 | 2/2003 | Nakamichi |
| 6,553,501 | B1 | 4/2003 | Yokoe |
| 6,597,620 | B1 | 7/2003 | McMinn |
| 6,611,435 | B2 | 8/2003 | Kumar et al. |
| 6,629,256 | B1 | 9/2003 | Ilan et al. |
| 6,630,849 | B2 | 10/2003 | Dellow |
| 6,711,694 | B1 | 3/2004 | Svensson et al. |
| 6,954,864 | B2 | 10/2005 | Schelling |
| 6,988,214 | B1 | 1/2006 | Verdun |
| 6,988,217 | B1 | 1/2006 | Madrid et al. |
| 7,089,437 | B2 | 8/2006 | Swoboda |
| 7,152,169 | B2 | 12/2006 | Cooper et al. |
| 7,159,766 | B2 | 1/2007 | Wurzburg |
| 7,200,762 | B2 | 4/2007 | Pearl |
| 7,301,373 | B1 | 11/2007 | Bailey et al. |
| 7,409,568 | B2 | 8/2008 | Tam et al. |
| 7,420,378 | B2 | 9/2008 | Audet et al. |
| 7,454,637 | B2 | 11/2008 | Er et al. |
| 7,464,276 | B2 | 12/2008 | Rusu et al. |
| 7,498,694 | B2 | 3/2009 | Luo et al. |
| 7,681,054 | B2 * | 3/2010 | Ghiasi et al. ............... 713/320 |
| 8,112,647 | B2 | 2/2012 | Bramover et al. |
| 8,156,287 | B2 * | 4/2012 | Bose et al. ............... 711/137 |
| 2003/0125900 | A1 | 7/2003 | Orenstien et al. |
| 2004/0268166 | A1 | 12/2004 | Farkas et al. |
| 2008/0098242 | A1 | 4/2008 | Peterson |
| 2009/0150696 | A1 | 6/2009 | Song et al. |
| 2009/0164814 | A1 | 6/2009 | Axford et al. |

OTHER PUBLICATIONS

International Search Report and the Written Opinion of International Application No. PCT/US2011/041291 mailed Sep. 28, 2011.

Fischer, et al; "A 90nm Variable-Frequency Clock System for a Power-Managed Itanium.RTM.-Family Processor"; Solid-State Circuits Conference, 2005. Digest of Technical Papers. ISSCC. 2005 IEEE International, Publication Date: Oct. 2010 Feb. 2005, pp. 294-295 & 599. vol. 1, San Francisco, CA, ISSN: 0193-6530, ISBN: 0-7803-8904-2.

Karnik, et al "Scaling trends of Cosmic Rays induced Soft Errors in static latches beyond 0.18 pts" 2001 Symposium on VLSI Circuits of Technical Papers, pp. 61-62.

Goel, et al "Low-Overhead Design of Soft-Error-Tolerant Scan Flip-Flops with Enhanced-Scan Capability" 2006 Asia and South Pacific Conference on Design Automation, Jan. 24-27, 2006 pp. 665-670.

Krishnamohan, et al "A Highly-Efficient Techniques for Reducing Soft Errors in Static CMOS Circuits" pp. 126-131, 2004 IEEE International Conference on Computer Design (ICCD'04), 2004.

"Advanced Configuration and Power Interface Specification"; Hewlett-Packard Corporation, Intel Corporation, Microsoft Corporation, Phoenix Technologies Ltd., Toshiba Corporation; Oct. 10, 2006; 631 pages.

* cited by examiner

MANAGING MULTIPLE OPERATING POINTS FOR STABLE VIRTUAL FREQUENCIES

BACKGROUND OF THE INVENTION

1. Field of the Invention

This invention relates to computing systems, and more particularly, to efficient management of processor discrete operating points.

2. Description of the Relevant Art

The power consumption of modern integrated circuits (IC's) has become an increasing design issue with each generation of semiconductor chips. As power consumption increases, more costly cooling systems such as larger fans and heat sinks are utilized to remove excess heat and prevent IC failure. However, cooling systems increase the system cost. The IC power dissipation constraint is not only an issue for portable computers and mobile communication devices, but also for high-performance superscalar microprocessors, which may include multiple processor cores, or cores, and multiple pipelines within a core.

The power consumption of IC's, such as modern complementary metal oxide semiconductor (CMOS) chips, is proportional to at least the expression $fV^2$. The symbol f is the operational frequency of the chip. The symbol V is the operational voltage of the chip. In modern microprocessors, both parameters f and V may be varied during operation of the IC. For example, during operation, modern processors allow users to select one or more intermediate power-performance states between a maximum performance state and a minimum power state. The maximum performance state includes a maximum operating frequency and the minimum power state includes a minimum operating frequency. The intermediate discrete power-performance states (P-states) include given scaled values for a combination of the operating frequency and the operational voltage.

Software, such as an operating system or firmware, or hardware may select a particular P-state based on at least a projected time to change states, a selected power limit, workload characteristics, and inputs from on-chip power monitors corresponding to a current workload. However, a computed combination of operational frequency and operational voltage typically does not match a combination corresponding to a discrete given P-state. Therefore, a close-matching given P-state is chosen. Typically, this chosen P-state may correspond to a power consumption lower than a computed power limit. Accordingly, the performance of the chosen P-state is lower than a computed power limit. If several more discrete P-states are added to a processor to provide finer grain combinations of operational frequency and voltage, then the design and test costs of the processor increase.

In view of the above, efficient methods and mechanisms for management of processor discrete operating points are desired.

SUMMARY OF EMBODIMENTS OF THE INVENTION

Systems and methods for managing multiple discrete operating points to create a stable virtual operating point are contemplated.

In one embodiment, a processor comprises several functional blocks and a power manager. Each of the functional blocks produces data corresponding to an activity level associated with the respective functional block. The power manager determines a power consumption value based on the data once every given sample interval. In addition, the power manager determines a signed accumulated difference over time between a given power target and the power consumption value. In one embodiment, the power target may correspond to a thermal design power (TDP) for the processor. In various embodiments, hysteresis may be used to avoid unproductive P-state transitions. In such embodiments, the power manager selects a lower power-performance state (P-state) than a current P-state if the signed accumulated difference is less than a negative threshold by more than a given delta. The power manager selects a higher P-state than a current P-state if the signed accumulated difference is greater than a positive threshold by more than a given delta. Also contemplated are embodiments where a minimum residency in a P-state may be required before a transition to another P-state is permitted.

These and other embodiments will be further appreciated upon reference to the following description and drawings.

Figure 1:
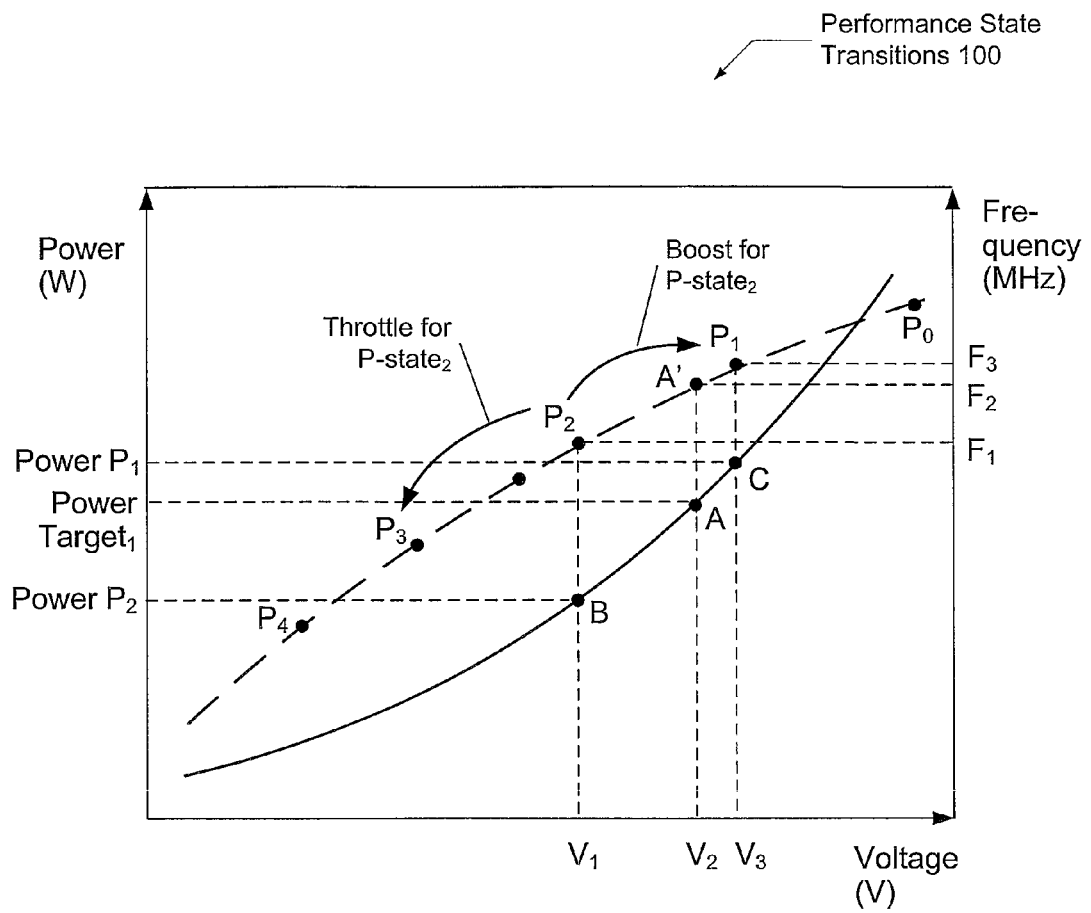
FIG. 1 is a generalized block diagram of one embodiment of power-performance state transitions for a semiconductor chip.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of power-performance state transitions 100 for a semiconductor chip is shown. Two curves are shown in the diagram illustrating non-linear (e.g., cubic or quadratic) relationships between power versus voltage and frequency versus voltage. Five discrete power-performance states (P-states) are shown in the diagram denoted as P0 to P4. A small number of discrete P-states are shown to simplify the diagram. Although only five discrete P-states are shown, other numbers of discrete P-states may be supported.

In the diagram shown, the P-state $P_4$ may correspond to a discrete state with a lowest performance of all the supported discrete states and comprises the lowest operational frequency. In addition, the P-state $P_4$ may correspond to a discrete state with a lowest power consumption of all the supported discrete states and comprises the lowest operational voltage. On the other hand, the P-state $P_0$ may correspond to a discrete state with a highest performance of all the supported discrete states and comprises the highest operational frequency. In addition, the P-state $P_0$ may correspond to a discrete state with a highest power consumption of all the supported discrete states and comprises the highest operational voltage. Typically, the endpoint discrete states represented by P-states $P_0$ and $P_4$ define a region of predictable performance. Therefore, configuring a processor to support multiple P-states, or operating points, along the non-linear frequency versus voltage curve may provide stable, optimal utilization of power and delivery of performance for the semiconductor chip, such as a processor. The management of the P-states may conform to an industry standard such as the Advanced Configuration and Power Interface (ACPI) standard, originally developed by Intel Corp., Microsoft Corp., and Toshiba Corp.

As shown in the diagram, a power target$_1$ (e.g., a desired power consumption level) may be chosen for the chip. In one embodiment, the selected power target$_1$ may correspond to a thermal design power (TDP) of the chip. The thermal design power (TDP), which may also be referred to as a thermal design point, represents a maximum amount of power a cooling system in a computer is able to dissipate. A cooling system for a laptop processor may be designed for a 20 watt TDP. Therefore, it has been determined that the cooling system is able to dissipate 20 watts without exceeding the maximum junction temperature for transistors within the processor. The TDP value may differ depending on the chip manufacturer producing the chip. For example, one manufacturer may define the TDP value as a power value measured at a default voltage level under given worst-case temperature conditions. Another manufacturer may define the TDP value as a maximum power value measured over a given interval as the chip executes typical applications versus high-power virus applications. Other measurement definitions are possible and contemplated.

In one embodiment, a power model executed on a pre-silicon model of the die 102 may perform a power measurement. Later in a design cycle, power measurements may be performed on actual fabricated silicon dies during a testing phase and debugging phase. In one embodiment, a peak power value for a chip may be defined by functional failure of the chip executing a high-power application on the core. The TDP value is typically less than the peak power value. The TDP value may be used to set the operational voltage and the operational frequency of a chip for binning purposes.

The value power target$_1$ in FIG. 1 may represent an assigned TDP value. As shown in FIG. 1, the power target$_1$ corresponds to a data point A on the power versus voltage non-linear curve. Data point A corresponds to an operating voltage $V_2$. Projecting data point A onto the non-linear frequency versus voltage curve with respect to the operating voltage $V_2$ provides data point A'. The data point A' corresponds to an operating frequency $F_2$. The operating point represented by the combination of the operating voltage $V_2$ and the operating frequency $F_2$ may provide an optimal utilization of power and delivery of performance for the chip.

As described above and shown in the diagram, an operating point for power target$_1$ is identified by data point A'. However, this operating point is not represented by a discrete P-state on the power versus frequency curve. The data point A' is located between the P-states $P_1$ and $P_2$. In order to reduce power consumption, the P-state $P_2$ may be chosen as an initial operating point for the corresponding chip. A corresponding combination of the operating voltage $V_1$ and the operating frequency $F_1$ may be the resulting chosen operating point. This operating point corresponds to a lower power consumption value than the value power target$_1$. The value Power $P_2$ indicates the lower power consumption value of the operating point corresponding to the P-state $P_2$.

A chip, such as a processor, may continue processing workloads utilizing an initially assigned P-state until either (i) the workload significantly changes which causes a significant change in a reported activity level, or (ii) the initial TDP value changes, such as being adjusted by a power monitoring software or firmware, which changes the power target value shown in the diagram. For example, if a processor is executing instructions for a workload that is halved at a given point in time, the resulting total drawn current and thermal energy will be significantly reduced. In one embodiment, a power manager, which may be located within the processor, may detect this condition and accordingly choose a different P-state corresponding to a higher power-performance operating point. For example, the power manager may determine to increase, or boost, the current P-state $P_2$ to the higher performance P-state $P_1$. For purposes of discussion, higher performance P-states may have a lower number. For example, $P_0$ may represent a higher power-performance state that $P_1$. However, designations could be reversed such that $P_0$ is used to represent a lower power-performance state than $P_1$. The chosen approach for designations may simply be a matter of preference.

A "throttle" of a P-state includes reducing the currently selected P-state by one (or more) P-state(s) to a lower power consumption P-state. In contrast, a "boost" of a P-state includes increasing the currently selected P-state by one (or more) P-state(s) to a higher performance P-state. Throttling the P-state $P_2$ includes transitioning the currently selected P-state $P_2$ to the lower power-performance state $P_3$. A simple illustration of boosting and throttling a given P-state, such as the P-state $P_2$ as an example, is shown in FIG. 1. In some embodiments, each boost operation and each throttle operation may cause a currently selected P-state to transition by two or more P-states when the logic supports this added complexity. The P-state transitions may be controlled by logic within a processor, and thereby is a self-contained system. However, power management software running on the processor or a rack controller located external to the processor, may alter the TDP value for the processor, which changes the power target value in the diagram.

Although the operating point represented by the P-state $P_2$ in FIG. 1 consumes less power than the power target$_1$ value, the operating point represented by $P_2$ also has less performance. Rather than maintain a lower performance P-state until a significant change in a measured activity level, a processor may toggle between two discrete P-states in order to achieve an average "virtual" operating point for the current workload. For example, a power manager may determine for a same workload an amount of time to utilize P-state $P_2$ before boosting to P-state $P_1$. Similarly, the power manager may determine for the same workload an amount of time to utilize P-state $P_1$ before throttling to P-state $P_2$. This process may occur multiple times until the workload significantly changes. An average of the times spent in a particular P-state coupled with the operating voltage and frequency may have an effect the processor was utilizing a "virtual" operating point represented by data point A' in FIG. 1. Such a method would enable flexible power management with arbitrary power limit settings to achieve stable virtual operating points (or virtual P-state) for any workload by building on already existing discrete P-states.

Figure 2:
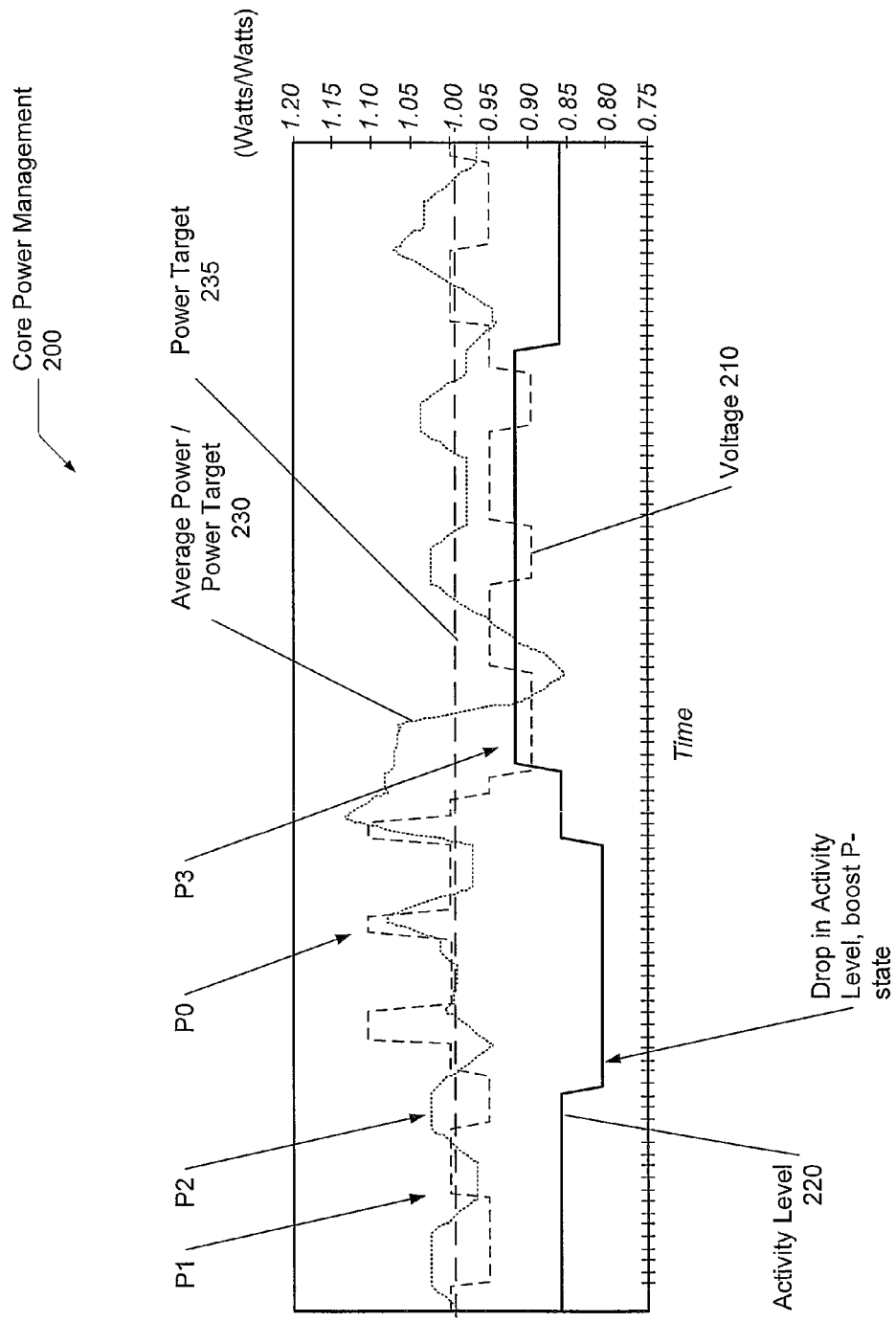
FIG. 2 is a generalized block diagram of one embodiment of core power management.

Turning now to FIG. 2, one embodiment of a core power management system 200 is shown. Changes to an operational voltage 210 and a measured activity level 220 over time are shown. In addition, a power target 235 and an average power versus a power target ratio 230 is shown over time. As shown in FIG. 2, there are P-state transitions both when an activity level experiences a significant change and when the activity level is constant. In the diagram, the P-state transitions correlate with changes in the operating voltage 210. Some P-state values are labeled in the diagram. For example, with a constant activity level 220, a P-state $P_1$ transitions to P-state $P_2$, which has a lower operating voltage as shown in the diagram. Toggling between P-state values when the measured activity level is constant may be referred to as P-state dithering. The P-state dithering may be used to maintain a ratio close to unity between an average power consumed on the chip and a power target, such as a TDP value. By maintaining such a ratio close to unity, the chip may seek to maximize performance while still consuming a desired amount of power (e.g., an amount of power dissipated by a corresponding cooling system).

Figure 3:
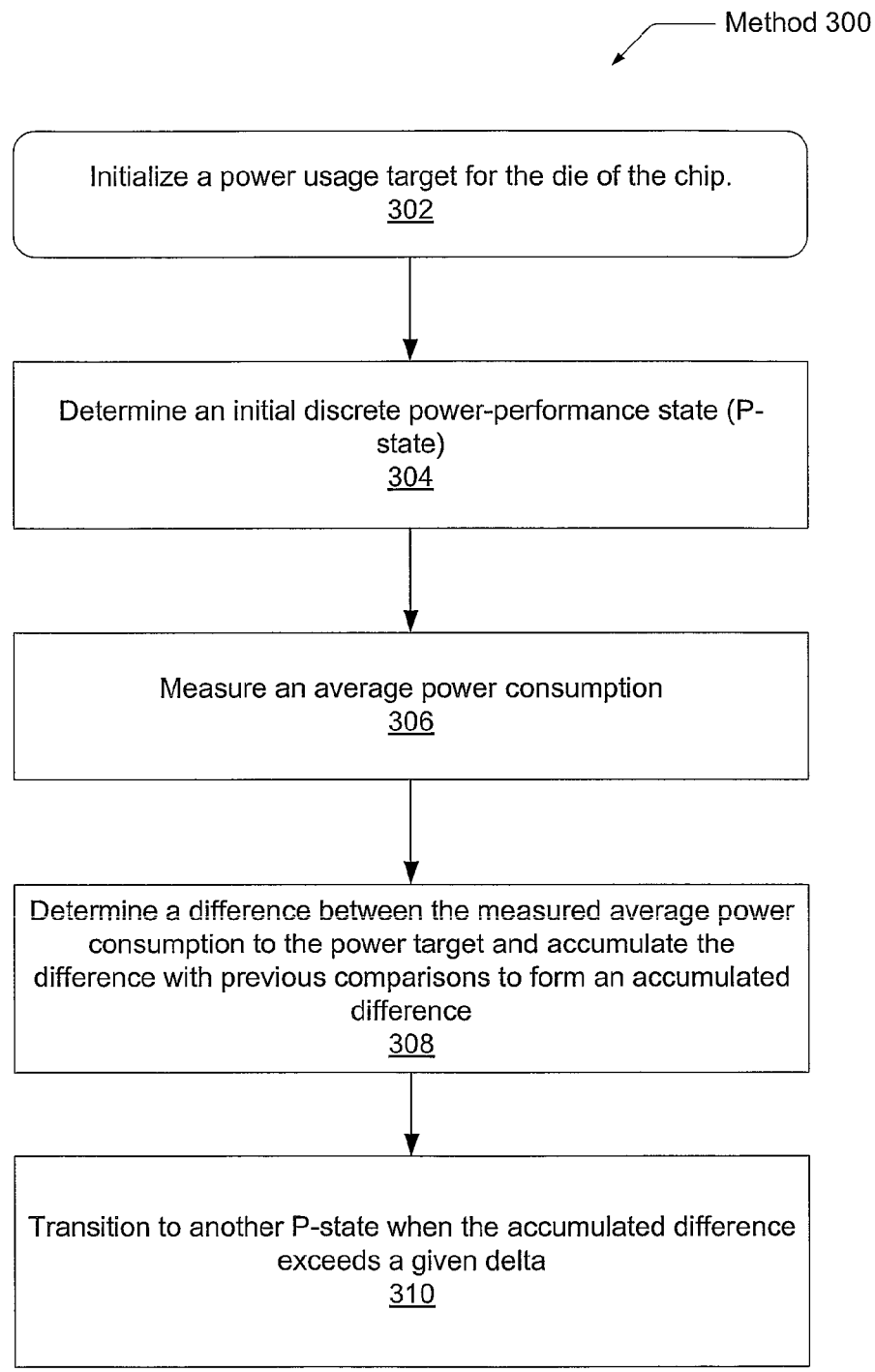
FIG. 3 is a flow diagram of one embodiment of a method for managing multiple discrete operating points to create a stable virtual operating point.

Turning now to FIG. 3, one embodiment of a method 300 for managing multiple discrete operating points to create a relatively stable virtual operating point is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 302, a power usage target for the die of a chip is initialized. Any of a variety of methods for selecting a power usage target, including those described earlier, may be used. In block 304, an initial discrete power-performance state (P-state) for the die is determined at a given workload. Software, such as firmware, and/or hardware may determine the P-state. A process such as that depicted in FIG. may be used to determine a P-state. Average power consumption for the die is then measured in block 306. Further details of such a measurement are provided later. In block 308, the measured average power consumption is compared to a power target and a difference determined. In one embodiment, this difference may be accumulated with other determined differences. For example, an accumulated difference value may be maintained. While a transition to another P-state could be initiated in response to detecting a difference between the target and the measured power, such an approach may cause unproductive transitions between P-states. Therefore, in one embodiment, various techniques are utilized to prevent such unwanted transitions. In one embodiment, a given delta is used for purposes of determining when an accumulated difference is sufficient to cause a P-state transition. For example, if the measured average power exceeds the target power by more than the given delta, then a transition to a higher P-state may be initiated or otherwise permitted. Similarly, if the measured average power falls below the target power by at least a given delta, then a transition to a lower P-state may be initiated or otherwise permitted. It is noted that the above described deltas could be utilized as values which must be exceeded or simply met as desired. In some cases, a given delta for both a transition to a higher or lower state may be the same (in terms of absolute value). In other embodiments, a different delta value could be used for transitions to a higher state than transitions to a lower state. All such embodiments are contemplated. Additionally, the delta values may or may not be programmable in various embodiments. In addition to the above, further conditions may be utilized to determine whether a P-state transition may occur. For example, in some embodiments a minimum residency in a P-state may be required before a transition is permitted. Further discussion of such a minimum residency will be provided in the discussion of FIG. 5. In block 310, when the accumulated difference reaches a given delta, a transition to another P-state may occur. For example, a power manager may select a lower power-performance state (P-state) than a current P-state if a signed accumulated difference corresponding to the above comparisons over time falls below a given threshold. The lower P-state may generally correspond to a power consumption value that is less than the power target. Similarly, the power manager may select a higher P-state than a current P-state if the signed accumulated difference corresponding to the above comparisons over time exceeds the given delta.

Referring again to FIG. 2, the activity level 220 may track the workload. As shown in the embodiment of FIG. 2, P-state transitions occur when the ratio of average power to power target varies from unity. In various embodiments, a given threshold variance may be used to determine when a P-state transition occurs. Alternatively, an accumulated signed difference may be found between the measured average power and the power target, rather than a ratio. Before further details are provided, one embodiment of measuring an activity level to track the workload is described.

Figure 4:
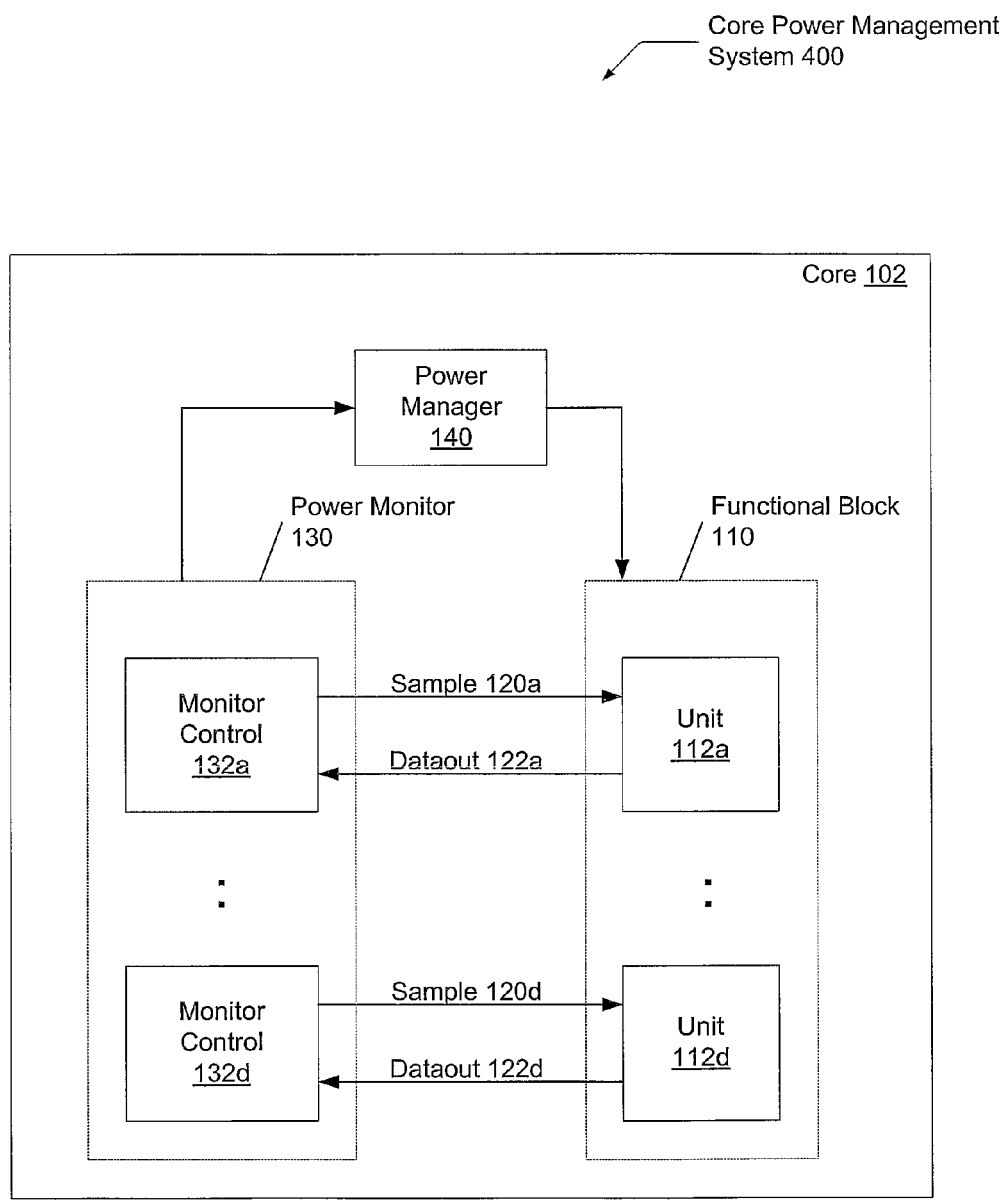
FIG. 4 is a generalized block diagram of one embodiment of a core power management system.

Referring to FIG. 4, one embodiment of a core power management 400 is shown. Here, core 102 may be any integrated circuit (IC). In one embodiment, core 102 may be a processor core. A processor core may have an on-die instruction and data cache. The processor core may be a superscalar processor with a single pipeline or multiple pipelines. In another embodiment, core 102 may be an application specific IC (ASIC). Any transistor family may be used to implement core 102. Examples include metal oxide semiconductor field effect transistors (MOSFETs) and bipolar junction transistors (BJTs).

A functional block 110 may include transistors configured to perform logic functions, data storage, or other. For power management purposes, functional block 110 may be divided into units 132a-132d. As used herein, elements referred to by a reference numeral followed by a letter may be collectively referred to by the numeral alone. For example, units 132a-132d may be collectively referred to as units 132. In one embodiment, units 132 may not correspond to functional components of a processor, such as a reorder buffer, a memory management unit, an execution unit, and so forth. Rather, units 132 may be selected based on the types of signals to be sampled for power management purposes. For example, in one embodiment, signals selected to be sampled include clock enable signals routed to local clock distribution blocks.

The selection of which signals to sample during a particular clock cycle may correspond to how well the selection correlates to the amount of switching node capacitance within units 132. The selected signals to be sampled, such as clock enable signals, may overlap functional blocks in the floorplan. Therefore, the division separating, for example, unit 132a and 132b may not correspond to a division in the floorplan. Units 132 are units that consume power and this power is to be measured in real-time. The activity level of the die associated with a current workload may correspond to values, or weights, associated with selected signals to be sampled.

In one embodiment, Power Monitor 130 may be used to collect data from units 132, such as the logic values of all the given sampled signals. In one embodiment, the values of the sampled signals may be scanned out in a serial manner. Therefore, the selected signals may be sampled in a single clock cycle from each of Units 112 and serially scanned out before the next sample is performed. After collecting the data, Power Monitor 130 may calculate a power consumption estimate. One Monitor Control 132 may correspond to each Unit 132. In alternative embodiments, a Monitor Control 132 may collect data for two or more Units 112 and calculate total power consumption estimation for those Units 112. In yet another embodiment, one Monitor Control 132 (i.e. Control 132a) may have a signal interface with one or more other Monitor Controls 132 (i.e. Controls 132b-132d) in order to collect data from the one or more Monitor Controls 132 (i.e. Controls 132b-132d). Then a power consumption estimate for the one or more Monitor Controls 132 may be calculated.

The signals Sample 120 and Dataout 122 may be control and data signals used for power management purposes. The interface signals between Power Monitor 110 and Functional Block 130 may comprise any necessary number of signals and communication protocols. In one embodiment, the control signal Sample 120 may be asserted for a single clock cycle only during a chosen repeating interval, such as every 100 clock cycles. In one embodiment, at a given number of clock cycles after the control signal Sample 120 is asserted, the data signal Dataout 122 may begin providing a logic value for a different sampled signal each clock cycle. In other words, the data signal Dataout 122 may be used to scan out a chain of values comprising the logic values of the sampled signals at a particular cycle. Also, in other embodiments, there may not be a single pair of signals between each Monitor Control 132 and Unit 112 pair. In an alternative embodiment, additional signals may be included in order for a Monitor Control 132 to poll a Unit 112, for a Unit 112 to acknowledge to a Monitor Control 132 that it is ready to convey output data.

A multiple number of samples may be taken during a given time interval. The determination of the number of intermittent clock cycles to use before computing an activity level may depend on the desired accuracy and confidence of the sampled data. A spreadsheet, or a look-up table, may be generated using both statistical analysis and measurements of both the real power consumption of an application and estimated power consumption from a sampling. A confidence level and an error rate may be chosen to further develop the statistical analysis. An example of a real-time power estimation method includes application Ser. No. 12/101,598, filed Apr. 11, 2008, entitled "Sampling Chip Activity for Real Time Power Estimation", which is incorporated herein by reference in its entirety.

When the Power Monitor 130 calculates a power consumption estimate from the data received from Functional Block 110 over repeated intervals, the Power Monitor 130 has determined a power profile of the currently running application(s). This determination is conveyed to the Power Manager 140. The Power Manager 140 may alter an operating point of functional block 110 in order to decrease (or increase) power if the application is above (below) a threshold limit. For example, the Power Manager 140 may cause a boost or a throttle of a current P-state to transition to another given P-state.

In one embodiment, during the specified time period named above, the Power Manager 140 may compute a signed running accumulated difference between the power profile provided by the Power Monitor 130 and the power target. Again, the power target may be a thermal design point (TDP). The accumulated difference may be calculated at the end of each given time interval as AccTdpDelta=AccTdpDelta+ (TDP−RcvdPwr). Here, the variable AccTdpDelta is the signed running accumulated difference. The variable TDP is the assigned thermal design power, or an equivalent number of thermal credits. The variable RcvdPwr is the power consumption estimation received from the Power Monitor 130. This value may track the activity level of the die by measuring the sampled signals in the functional blocks 110.

If the measured activity level represented by the variable RcvdPwr is higher than the TDP, then the accumulated value AccTdpDelta drifts toward a negative value. When the accumulated value reaches a negative given threshold, the power manager may determine to throttle the current P-state. Referring again to FIG. 1, an example of throttling a current P-state would be to transition from P-state $P_1$ to P-state $P_2$. Such a condition may occur when the activity level is high within the core. If the activity level remains at a high value, over time the power manager may continue to throttle the current P-state.

If the measured activity level is lower than the TDP, then the accumulated value AccTdpDelta drifts toward a positive value. When the accumulated value reaches a positive given threshold, the Power Manager 140 may determine to boost the current P-state. Referring again to FIG. 1, an example of boosting a current P-state would be to transition from P-state $P_2$ to P-state $P_1$. Such a condition may occur when the activity level is low within the core. If the activity level remains at a low value, over time the power manager may continue to boost the current P-state.

The Power Manager 140 may be able to provide quicker responses to potential thermal problems in core 102 when the information sent from the Power Monitor 130 corresponds to actual activity levels and power consumption within core 102 and not temperature information. Analog or digital thermal sensors placed throughout the die of a semiconductor chip die may determine a temperature waveform over time. The thermal sensors provide information as to when the die heats up in a particular area due to increased compute activity. However, these sensors respond to each change in thermals, whether it's driven by a compute-related increase in power consumption in the core 102 or by an external environmental factor, such as a rise in ambient temperature. For example, surrounding servers in a rack system in a data center may cause a rise in ambient temperature. The amount of switching capacitance within a particular core may not change over a time interval, but the sensors may report higher thermal energy consumption due to the rise in ambient temperature. In addition, there is a time delay between a compute-related increase in power consumption and a temperature increase. Therefore, while attempting to maintain a ratio of unity between average power consumption and a power target, measurements associated with an activity level and switching capacitance within a core versus measurements of temperature may provide better results.

Figure 5:
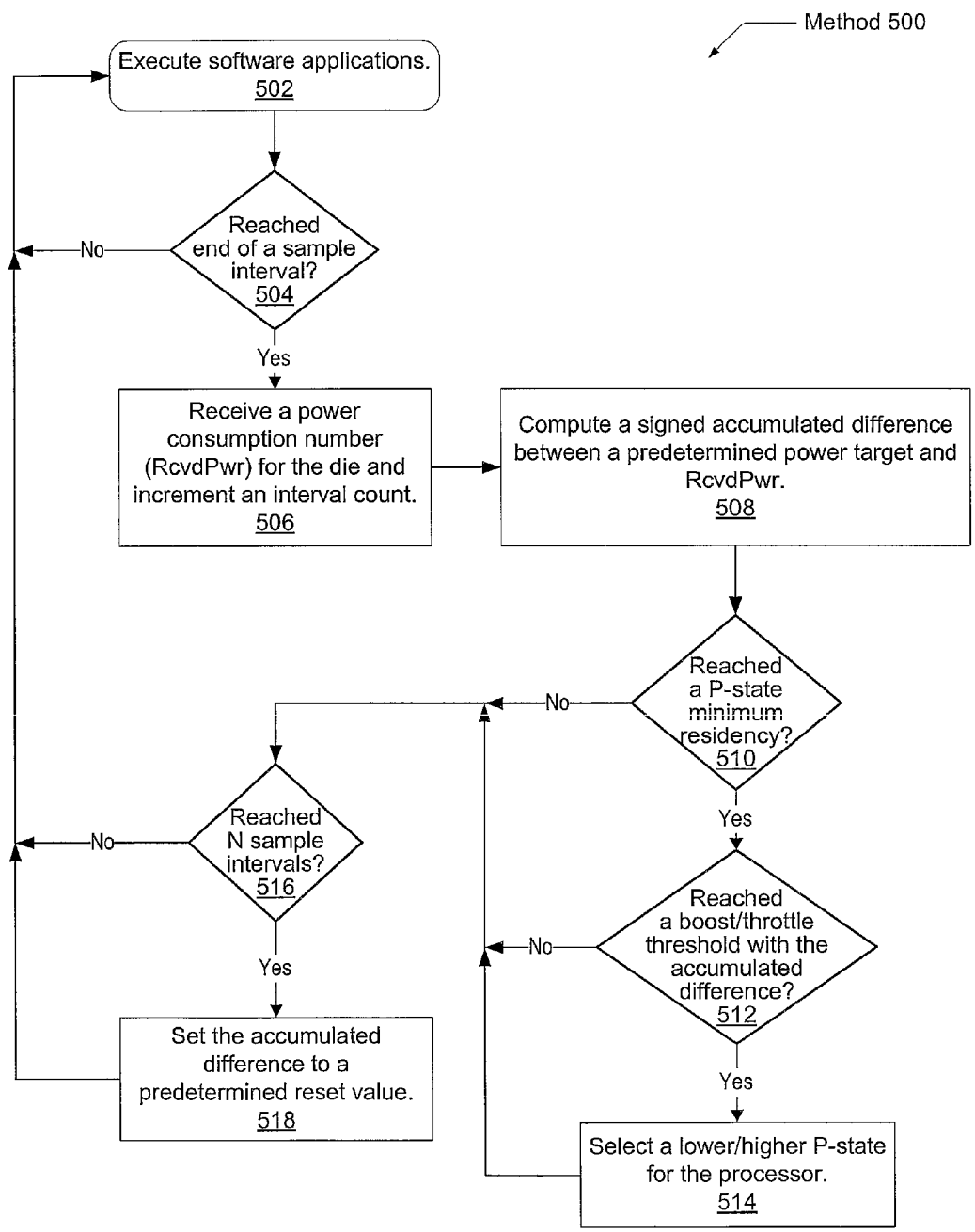
FIG. 5 is a flow diagram of one embodiment of a method for managing multiple discrete operating points to create a stable virtual operating point.

Turning now to FIG. 5, another embodiment of a method 500 for managing multiple discrete operating points to create a stable virtual operating point is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 502, a semiconductor chip executes instructions of one or more software applications. If the end of a given sampling interval is reached (conditional block 504), then in block 506, a power consumption estimate is determined and conveyed to a power manager. A power consumption estimate may be found by sampling selected signals in functional blocks and associating corresponding weights to the sampled signals as described earlier. A counter corresponding to a count of determined power estimation values may be incremented. In block 508, the power manager may compute a signed accumulated difference between a given power target, such as a TDP, and the received power consumption value. The computation as described earlier may be AccTdpDelta=AccTdpDelta+(TDP−RcvdPwr), wherein the variable RcvdPwr represents the received power consumption value.

It is noted when a P-state transition occurs, the signed accumulated difference, AccTdpDelta, may still exceed a given threshold by the time another sample interval occurs. For example, a boost from a P-state $P_2$ to a P-state $P_1$ may occur due to the value AccTdpDelta is greater than a positive boost threshold. After the P-state transition, at the next time interval, the signed accumulated difference, AccTdpDelta, may still be greater than the positive boost threshold. There may not have been sufficient time for the measured power consumption value to exceed the TDP value. Therefore, it's possible to rapidly continue boosting the current P-state before it is determined the current P-state provides the best power-performance operating point at a given time.

In order to avoid rapid P-state transitions as described above, a following P-state transition may not be allowed to occur for a given time after a current P-state transition. The given time may be referred to as a minimum residency. In one embodiment, a counter may be used to determine whether a permissible amount of time has elapsed following a current P-state transition. The counter value may be compared to a given threshold. Alternatively, the counter may be loaded with the given threshold and decremented to a value of zero. When this permissible amount of time has elapsed, another P-state transition may occur.

In addition, value aging for the accumulated difference AccTdpDelta may be used. Value aging may aid in preventing overheating of the chip die. An aged accumulated difference may remain transitioning, or dithering, between high power P-states for a long time. The accumulated difference, AccTdpDelta, may continue accumulating when a P-state is throttled. After a period of time, the accumulated difference may no longer represent an actual thermal energy headroom available for boost. Therefore, from time to time, the accumulated difference AccTdpDelta may be set to a reset value at the end of a given time period. The reset value may vary from a fraction of the current value of the accumulated difference AccTdpDelta to zero. A value stored in a configuration register may be used to determine the reset value. For example, a first stored value may correspond to a reset value equal to the accumulated difference AccTdpDelta. A second stored value may correspond to a reset value equal to the accumulated difference AccTdpDelta shifted (e.g., divide by 2, divide by 4, and so forth). A third stored value may correspond to a reset value equal to zero.

A counter, which may be decrementing in one example, may set the given time period referred to above. The counter may load a value N, which is stored in a configuration register. After N samples occur, wherein the accumulated difference AccTdpDelta is updated at the end of each sample, or time interval, accumulated difference AccTdpDelta may be reset. The counter loaded with the value N may be reset each time the accumulated difference AccTdpDelta changes sign.

Referring again to method 500 in FIG. 5, if a P-state minimum residency time period has not been reached (conditional block 510), then a check is performed regarding whether N samples have occurred. At the end of each sample interval, a new power consumption value for the die is determined and a new value is computed for the accumulated difference AccTdpDelta. If a count of N samples has occurred (conditional block 516), then in block 518, accumulated difference AccTdpDelta is set to a given reset value as described above.

If a P-state minimum residency time period has been reached (conditional block 510), then a check is performed regarding the boost and throttling thresholds. A comparison may be performed to determine whether the signed accumulated difference AccTdpDelta exceeds a threshold. For example, the accumulated difference AccTdpDelta may be greater than a positive boost threshold. Alternatively, the accumulated difference AccTdpDelta may be less than a negative throttle threshold. If the accumulated difference AccTdpDelta exceeds a threshold (conditional block 512), then in block 514, a corresponding next P-state is selected for the chip die. For example, if the signed accumulated difference AccTdpDelta is greater than a positive (boost) threshold, then a transition to a higher power-performance P-state than the current P-state may occur. Alternatively, if the signed accumulated difference AccTdpDelta is less than a negative throttling threshold, then a transition to a lower power-performance P-state than the current P-state may occur.

In one embodiment, if a processor comprises multiple cores, a power consumption estimate may be computed within each core. In addition, each core may determine a signed accumulated difference, AccTdpDelta. When any of the multiple cores exceeds a boost or throttling threshold, the P-state for the entire processor may transition accordingly. Then control flow of method 500 moves to conditional block 516.

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, the instructions may comprise behavioral-level descriptions or register-transfer level (RTL) descriptions of the hardware functionality in a programming language such as C, or a design language (e.g., HDL) such as Verilog, VHDL, or a database format such as GDS II stream format (GDSII). These instructions may then be read and used to fabricate hardware comprising the system (or portions of the system). In some cases the description may be read by a synthesis tool (e.g., program code running on a computing device) to form an implementation of the design. For example, such a tool may be used to synthesize the description to produce a netlist comprising a list of gates from a synthesis library. The netlist may generally comprise a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator, such as those from vendors Cadence®, EVE®, and Mentor Graphics®. For example, in such an embodiment the instructions may be utilized to configure FPGA based hardware to perform according to the design. Numerous such embodiments are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
    one or more functional blocks within a processor core, each configured to produce data corresponding to an activity level of a respective block, wherein each functional block is configured to operate at one or more discrete power-performance states (P-state); and
    a power manager within the processor core coupled to the one or more functional blocks, wherein the power manager is configured to:
        determine a virtual P-state corresponding to a desired power consumption, wherein the virtual P-state is not a supported discrete P-state;
        determine a respective minimum residency time to be used for each of a lower P-state lower than the virtual P-state and a higher P-state higher than the virtual P-state; and
        alternately select and convey the lower P-state and the higher P-state using the respective minimum residency times in order to produce an average power consumption over time that more closely corresponds to the desired power consumption than a power consumption corresponding to either the lower P-state or the higher P-state.

2. The computing system as recited in claim 1, wherein the power manager is further configured to select a next P-state responsive to determining at least a respective minimum residency time has elapsed for a current P-state.

3. The computing system as recited in claim 1, wherein the power manager is configured to:
    determine an average power consumption during a given time interval for a functional block of the one or more functional blocks based at least in part on said data;
    select a P-state lower than a current P-state in response to determining the average power consumption exceeds the desired power consumption by at least a first delta amount, the first delta amount having an absolute value greater than zero; and
    select a P-state higher than a current P-state in response to determining the average power consumption is less than the desired power consumption by at least a second delta amount, the second delta amount having an absolute value greater than zero.

4. The computing system as recited in claim 3, wherein the desired power consumption corresponds to a thermal design power value for the one or more functional blocks.

5. The computing system as recited in claim 3, wherein the power manager is further configured to select a P-state two or more states away from the current P-state based on a rate of reaching a corresponding threshold.

6. The computing system as recited in claim 1, wherein the power manager is further configured to:
    determine a signed accumulated difference over time between the desired power consumption and a plurality of functional block power consumption values;
    select a P-state lower than a current P-state in response to determining the signed accumulated difference is greater than a first delta value, the first delta value having an absolute value greater than zero; and
    select a P-state higher than a current P-state in response to determining the signed accumulated difference is less than a second delta, an absolute value of the second delta value being greater than zero.

7. The computing system as recited in claim 6, wherein the power manager is further configured to reset the signed accumulated difference at the end of a given time period.

8. The computing system as recited in claim 6, wherein the time interval comprises a maximum count of N functional block sample intervals, and wherein the power manager is further configured to reset the count responsive to detecting the signed accumulated difference has changed sign or the count has reached N, whichever occurs first.

9. A method implemented by a computing system for managing multiple discrete operating points to create a stable virtual operating point, the method comprising:
    producing data corresponding to activity levels of one or more functional blocks, wherein each operates at a respective power-performance state (P-state);
    determining a virtual power-performance state (P-state) corresponding to a desired power consumption, wherein the virtual P-state does not equal a supported discrete P-state;
    determining a respective minimum residency time for each of a lower P-state lower than the virtual P-state and a higher P-state higher than the virtual P-state;
    alternately selecting and conveying the lower P-state and the higher P-state using the respective minimum residency times in order to produce an average power consumption over time that more closely corresponds to the desired power consumption than a power consumption cooresponding to either the lower P-state or the higher P-state.

10. The method as recited in claim 9, wherein the method further comprises selecting a next P-state responsive to determining at least a respective minimum residency time has elapsed for a current P-state.

11. The method as recited in claim 9, further comprising:
    determining an average power consumption during a given time interval for a functional block of the one or more functional blocks based at least in part on said data;
    selecting a P-state lower than a current P-state in response to determining the average power consumption exceeds the desired power consumption by at least a first delta amount, the first delta amount having an absolute value greater than zero; and
    selecting a P-state higher than a current P-state in response to determining the average power consumption is less than the desired power consumption by at least a second delta amount, the second delta amount having an absolute value greater than zero.

12. The method as recited in claim 11, wherein the desired power consumption value corresponds to a thermal design power value for the one or more functional blocks.

13. The method as recited in claim 11, further comprising selecting a P-state two or more states away from the current P-state based on a rate of reaching a corresponding threshold.

14. The method as recited in claim 9, further comprising:
determining a signed accumulated difference over time between the desired power consumption and a plurality of functional block power consumption values;
selecting a P-state lower than a current P-state in response to determining the signed accumulated difference is greater than a first delta value, the first delta value having an absolute value greater than zero; and
selecting a P-state higher than a current P-state in response to determining the signed accumulated difference is less than a second delta, an absolute value of the second delta value being greater than zero.

15. The method as recited in claim 14, further comprising resetting the signed accumulated difference at the end of a given time period.

16. The method as recited in claim 14, wherein the time interval comprises a maximum count of N functional block sample intervals, and wherein the method further comprises resetting the count responsive to detecting the signed accumulated difference has changed sign or the count has reached N, whichever occurs first.

17. A non-transitory computer readable storage medium storing program instructions operable to manage multiple discrete operating points to create a stable virtual operating point, wherein the program instructions are executable to:
produce data corresponding to activity levels of one or more functional blocks, wherein each operates at a respective power-performance state (P-state);
determine a virtual power-performance state (P-state) corresponding to a desired power consumption, wherein the virtual P-state does not equal a supported discrete P-state;
determine a respective minimum residency time for each of a lower P-state lower than the virtual P-state and a higher P-state higher than the virtual P-state;
alternately select and convey the lower P-state and the higher P-state using the respective minimum residency times in order to produce an average power consumption over time that more closely corresponds to the desired power consumption than a power consumption corresponding to either the lower P-state or the higher P-state.

18. The storage medium as recited in claim 17, wherein the program instructions are further executable to select a next P-state responsive to determining at least a respective minimum residency time has elapsed for a current P-state.

19. The storage medium as recited in claim 18, wherein the program instructions are further executable to:
determine an average power consumption during a given time interval for a functional block of the one or more functional blocks based at least in part on said data;
select a P-state lower than a current P-state in response to determining the average power consumption exceeds the desired power consumption by at least a first delta amount, the first delta amount having an absolute value greater than zero; and
select a P-state higher than a current P-state in response to determining the average power consumption is less than the desired power consumption by at least a second delta amount, the second delta amount having an absolute value greater than zero.

20. The storage medium as recited in claim 19, wherein the program instructions are further executable to:
determine a signed accumulated difference over time between the desired power consumption and a plurality of functional block power consumption values;
select a P-state lower than a current P-state in response to determining the signed accumulated difference is greater than a first delta value, the first delta value having an absolute value greater than zero; and
select a P-state higher than a current P-state in response to determining the signed accumulated difference is less than a second delta, an absolute value of the second delta value being greater than zero.

\* \* \* \* \*